March 31, 1964  P. DUGAY  3,126,723

DRIVING DEVICES WITH SHEAR SECTION

Filed Dec. 10, 1962

INVENTOR
PIERRE DUGAY
BY
ATTORNEY

United States Patent Office 3,126,723
Patented Mar. 31, 1964

3,126,723
DRIVING DEVICES WITH SHEAR SECTION
Pierre Dugay, Asnieres, France, assignor to D.B.A.,
Paris, France, a French company
Filed Dec. 10, 1962, Ser. No. 243,341
Claims priority, application France Dec. 14, 1961
7 Claims. (Cl. 64—28)

The present invention relates to devices for the protection of driving members, said devices being so designed that, in the event of an overcouple occuring, for example as a result of damage to the driven member, there takes place a fracture of the small section of a shear shaft which is commonly referred-to as a "breaking section," the said fracture accordingly uncoupling the driven member from the driving member.

It is known to centre the shaft to be broken inside a sleeve mounted in a frame or cage, for example, and to centre the said shaft at the driven-member end inside a driving sleeve which ensures the transmission of movement to the driven member and which is in turn mounted on the above-mentioned centering sleeve.

The devices of this type are especially subject to the disadvantage that they do not permit of the use of sealing joints of the frictionless type between the centering sleeve and the frame or assembly cage and thus create a danger of seizure of the moving parts with respect to that part which is immobilized after a break has occurred, thereby eliminating the effect of the safety section.

The present invention has for its object to overcome these drawbacks and is directed to improvements in shear sections of the above type, said improvements being preferably employed simultaneously inasmuch as they then provide the maximum number of advantages, although they could also be employed separately, without thereby departing from the scope of the invention.

In accordance with one of the said improvements, the centering sleeve is positively driven in rotation by the shaft to be broken, while the driving means such as dog-clutches, for example, are located at the input end of the fracture zone, that is to say at the driving end, and the said sleeve is centered in the frame or in the assembly cage by means of a bearing such as a roller bearing, for example.

As a result of the continuous application of movement to the centering sleeve, fluid-tightness between said centering sleeve and the frame or stationary cage can be ensured by means of a rotary seal of the frictionless type, for example of the turbine seal type.

When the driven member is not rigid and therefore does not itself effect the centering of the driving sleeve, a friction ring or any like device for the purpose of preventing seizure is advantageously fitted between said driving sleeve and said centering sleeve. On the other hand, if the driven member is rigid, a clearance obtained by elimination of the above-mentioned ring prevents any friction.

The maintaining in axial position of the shaft to be broken with respect to the centering sleeve and to the driving sleeve is preferably ensured by means of flexible retainer-rings which are adapted to fit inside annular grooves with tapering or sloping sections formed in the shaft in such manner as to permit the disassembly of said shaft by means of tractive force.

It is also advantageous to provide at the end of the driving sleeve a detachable member forming a shoulder, for example a retainer-ring having a square section which is mounted opposite to a corresponding shoulder of the shaft to be broken on the input side or driving side of the fracture zone in such manner as to permit the extraction of the complete shaft assembly after the break has occured, simply by applying a tractive force on the extremity of the driving sleeve at the driven end thereof.

The characteristic features and advantages of the present invention will become more readily apparent from the description which follows below and which relates to one example of construction of the device in accordance with the invention, reference being made therein to the accompanying drawings, in which.

Figure 1:
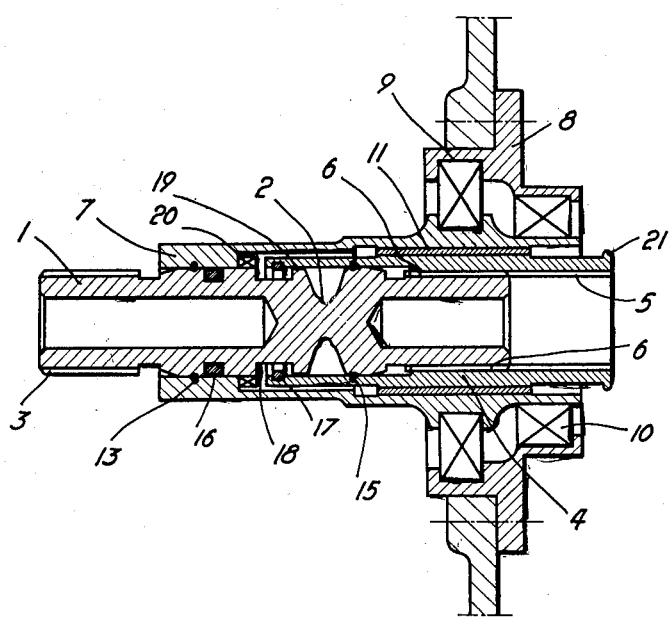
FIG. 1 is a view of the device in diametral cross-section.
Figure 2:
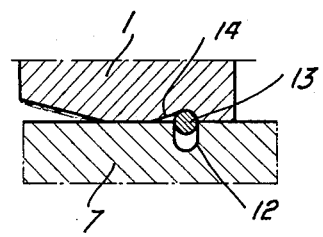
FIG. 2 is a detail view, on a larger scale, of the assembly of one of the retainer-rings for holding in position the shaft to be broken.

In the example which is illustrated in the drawing, the transmission of movement between the driving member and the driven member (which have not been illustrated in the drawings) is carried out by the shaft 1 in which is formed a portion 2 of reduced section. The driving member is coupled to the shaft 1 by means of splines 3 and the driven member is coupled to the sleeve 1 by means of the driving sleeve 4 which is provided with internal splines 5, the said internal splines co-operating with the splines 6 of the shaft 1. The shaft 1 and the sleeve 4 are mounted together inside the centering sleeve 7 which is in turn mounted inside the cage 8 with interposition of a bearing 9 and a rotary seal 10 of the turbine type, for example. A bearing-bush 11 which can be self-lubricating is interposed between the sleeve 4 and the sleeve 7.

A retainer-ring 13 is mounted in a groove 12 of the sleeve 7 and is adapted to fit inside a corresponding cage with tapering section 14 of the shaft 1. The ring ensures that the shaft is set in the correct axial position with respect to the sleeve. Similarly, a retainer-ring 15 which is mounted in a groove of the sleeve 4 and is adapted to fit inside a groove with corresponding tapering section of the shaft 1 effects the correct axial position-setting of the said shaft 1 and the sleeve 4. A static sealing joint 16 ensures fluid-tightness between the shaft 1 and the sleeve 7. A ring 17 of square section which is fitted in a groove at the extremity of the sleeve 4 at the driving end is thus located, when the components are in position, opposite an annular recess 18 of the shaft 1, the said recess being delimited on the driven side by a shoulder 19 against which the joint 17 can be brought to bear.

Dog clutches 20 effect the positive driving in rotation of the sleeve 7 by the shaft 1.

It will be understood from the foregoing that, in the case of fracture of the shaft 1 resulting from an overcouple, the two portions of said shaft remain in position by virtue of the retainer-rings 13 and 15. The sleeve 7 continues to be driven in rotation, thereby permitting the rotary seal 10 to continue to play the part of a sealing device, the broken portion of the shaft 1 and the sleeve 4 which are integral with the driven member become stationary but the bearing-bush 11 makes it possible for the sleeve to rotate without seizing and the centering remains positive.

After the occurrence of a fracture, it is possible either to extract the entire assembly by dismantling the cage 8 or to extract the sleeve 4 by making use of the external beading 21 and by applying tractive force thereon. The ring 17 of square section is brought to bear against the shoulder 19 of the shaft 1 and draws with it the two broken portions of this latter, the split ring 13 being driven out of the groove of the shaft 1 by virtue of the sloping section 14 and the ring 15 being driven out of its groove in the same manner.

It can be seen that the invention permits of easy assembly and disassembly of a complete interchangeable unit, positive centering of the different components whether driven in rotation or not without any danger of destruction of any parts other than the shaft which is intended to limit the stresses which are transmitted, elimination of any danger of seizure of the moving parts against those parts which are immobilized, the consequence of such seizure being to apply further movement to the immobilized parts and thus to eliminate the effect of the safety section, the use of rotary sealing joints of the frictionless type and in which fluidtightness is provided only if rotation takes place, and finally, rapid replacement of the broken shaft without complete dismantling.

It will be understood that the invention is not in any sense limited to the details of construction which have been illustrated or described and which have been given only by way of example. It accordingly follows as a particular result that the shaft to be broken could drive the centering sleeve by means other than dog-clutches, for example by screw means, by splines, or even be made integral with the sleeve on the driving side of the fracture zone; that the ring of square section which permits the shaft to be extracted by pulling on the driving sleeve could be replaced by any detachable means forming a shoulder; that the sealing joint and the bearing could be mounted on the driving side of the centering sleeve.

What I claim is:

1. A driving device of the type comprising a shaft having a shear section to be broken when submitted to an overcouple, a driving end adapted to be coupled with a driving member and a driven end adapted to be coupled with a driven member, and a sleeve surrounding said shaft for centering the same, said shaft comprising coupling means located between said shear section and said driving end and said sleeve comprising coupling means in engagement with said coupling means of said shaft to be driven in rotation by said shaft.

2. A driving device as in claim 1 wherein said coupling means of said shaft and of said sleeve are dog-clutches.

3. A driving device of the type comprising a shaft having a shear section to be broken when submitted to an overcouple, a driving end adapted to be coupled with a driving member and a driven end adapted to be coupled with a driven member, a frame having a hole inside which is mounted said driving device, a sleeve surrounding said shaft for centering the same, a roller bearing mounted in said hole between said frame and said sleeve to support said sleeve, said shaft comprising coupling means located between said shear section and said driving end and said sleeve comprising coupling means in engagement with said coupling means of said shaft to be driven in rotation by said shaft.

4. A driving device of the type comprising a shaft having a shear section to be broken when submitted to an overcouple, a driving end adapted to be coupled with a driving member and a driven end adapted to be coupled with a driven member, a frame having a hole inside which is mounted said driving device, a roller bearing mounted in said hole between said frame and said sleeve to support said sleeve, a rotary seal of the frictionless type mounted between said frame and said sleeve to ensure fluidtightness, said shaft comprising coupling means located between said shear section and said driving end and said sleeve comprising coupling means in engagement with said coupling means of said shaft to be driven in rotation by said shaft.

5. A driving device of the type comprising a shaft having a shear section to be broken when submitted to an overcouple, a driving end adapted to be coupled with a driving member and a driven end adapted to be coupled with a driven member, a sleeve surrounding said shaft for centering the same, a driving sleeve inside said centering sleeve and slidingly mounted on said shaft and rotatingly coupled with said shaft, a friction ring for preventing seizure mounted between said centering sleeve and said driving sleeve, said shaft comprising coupling means located between said shear section and said driving end and said sleeve comprising coupling means in engagement with said coupling means of said shaft to be driven in rotation by said shaft.

6. A driving device of the type comprising a shaft having a shear section to be broken when submitted to an overcouple, a driving end adapted to be coupled with a driving member and a driven end adapted to be coupled with a driven member, a sleeve surrounding said shaft for centering the same, a driving sleeve inside said centering sleeve and slidingly mounted on said shaft and rotatingly coupled with said shaft, said shaft comprising coupling means located between said shear section and said driving end and said sleeve comprising coupling means in engagement with said coupling means of said shaft to be driven in rotation by said shaft, said shaft further having annular grooves with a sloping section, said centering sleeve and said driving sleeve having grooves, and flexible retainer-rings being provided to fit inside said annular grooves of said shaft and inside said grooves of said driving sleeve and centering sleeve to maintain the axial position of said shaft with respect with said centering sleeve and said driving sleeve.

7. A driving device as in claim 6, said driving sleeve being further provided with a shoulder forming detachable member, and said shaft having a shoulder adapted to cooperate with said shoulder forming member of said driving sleeve to allow for the extraction of the complete shaft assembly after breakage by applying a tractive force on said driving sleeve.

References Cited in the file of this patent

UNITED STATES PATENTS

| | | |
|---|---|---|
| 2,394,669 | Dean | Feb. 12, 1946 |
| 2,540,997 | Schmitter | Feb. 6, 1951 |
| 2,585,113 | Gredell | Feb. 12, 1952 |